US011641133B2

(12) United States Patent
Nakamura et al.

(10) Patent No.: US 11,641,133 B2
(45) Date of Patent: May 2, 2023

(54) POWER MANAGEMENT SYSTEM, METHOD AND SERVER HAVING CONSUMPTION FACILITY FOR RECEIVING POWER FROM OUTPUT FACILITY

(71) Applicant: KYOCERA CORPORATION, Kyoto (JP)

(72) Inventors: Kazutaka Nakamura, Yokohama (JP); Yuji Kakuda, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 100 days.

(21) Appl. No.: 17/271,600

(22) PCT Filed: Aug. 26, 2019

(86) PCT No.: PCT/JP2019/033341
§ 371 (c)(1),
(2) Date: Feb. 26, 2021

(87) PCT Pub. No.: WO2020/045357
PCT Pub. Date: Mar. 5, 2020

(65) Prior Publication Data
US 2021/0344223 A1 Nov. 4, 2021

(30) Foreign Application Priority Data
Aug. 30, 2018 (JP) .............................. JP2018-161963

(51) Int. Cl.
H02J 13/00 (2006.01)
H02J 3/38 (2006.01)
(Continued)

(52) U.S. Cl.
CPC ........ *H02J 13/00022* (2020.01); *G05B 15/02* (2013.01); *H02J 3/381* (2013.01);
(Continued)

(58) Field of Classification Search
CPC ................. H02J 13/00022; H02J 3/381; H02J 13/00002; H02J 2300/24; H02J 2300/28;
(Continued)

(56) References Cited

U.S. PATENT DOCUMENTS 8,577,513 B2 * 11/2013 Yamashita ........ H02J 13/00002
700/297
10,600,134 B2 * 3/2020 Miyamoto ............. G01D 4/002
(Continued)

FOREIGN PATENT DOCUMENTS

EP 2533189 A1 12/2012
WO 2012050208 A1 4/2012
(Continued)

*Primary Examiner* — Ramesh B Patel
(74) *Attorney, Agent, or Firm* — Hauptman Ham, LLP

(57) ABSTRACT

A power management system includes an output facility configured to output output power with environment additive value and a consumption facility. The system further includes: a first receiver configured to receive, from the output facility, a message including an information element indicating the output power, a second receiver configured to receive, from the consumption facility, a message including an information element indicating consumption power consumed by the consumption facility, and a controller configured to identify the output power occupied in the consumption power and identify alternative power corresponding to a power loss, based on the power loss occurring on a power path from the output facility to the consumption facility. The controller is configured to identify the environment additive value corresponding to the output power occupied in the consumption power without based on the power loss.

11 Claims, 6 Drawing Sheets

(51) Int. Cl.
*G05B 15/02* (2006.01)
*G06Q 10/0631* (2023.01)
*G06Q 30/018* (2023.01)
*G06Q 50/06* (2012.01)

(52) U.S. Cl.
CPC .............. *H02J 13/00002* (2020.01); *G06Q 10/06313* (2013.01); *G06Q 30/018* (2013.01); *G06Q 50/06* (2013.01); *H02J 2300/24* (2020.01); *H02J 2300/28* (2020.01)

(58) Field of Classification Search
CPC ............ H02J 3/008; H02J 3/32; G05B 15/02; G06Q 10/06313; G06Q 30/018; G06Q 50/06; Y04S 50/10; Y04S 40/126; Y04S 10/50; Y02E 10/56; Y02E 40/70; Y02E 60/00
See application file for complete search history.

(56) References Cited

U.S. PATENT DOCUMENTS

| | | | | |
|---|---|---|---|---|
| 2008/0234871 A1* | 9/2008 | Yamada | ................. | G06Q 50/06 700/286 |
| 2008/0294472 A1* | 11/2008 | Yamada | ........... | G01N 33/57434 435/372 |
| 2012/0010760 A1* | 1/2012 | Yamashita | .............. | H02J 3/381 700/297 |
| 2013/0073106 A1* | 3/2013 | Yamada | ........... | H02J 13/00002 700/295 |

FOREIGN PATENT DOCUMENTS

| | | | | |
|---|---|---|---|---|
| WO | WO-2012050208 A1 * | 4/2012 | ................ | H02J 3/00 |
| WO | 2016110920 A1 | 7/2016 | | |

* cited by examiner

POWER MANAGEMENT SYSTEM, METHOD AND SERVER HAVING CONSUMPTION FACILITY FOR RECEIVING POWER FROM OUTPUT FACILITY

RELATED APPLICATIONS

The present application is a National Phase of International Application No. PCT/JP2019/033341, filed Aug. 26, 2019, and claims priority based on Japanese Patent Application No. 2018-161963, filed Aug. 30, 2018, which is incorporated by reference herein in its entity.

TECHNICAL FIELD

The present invention relates to a power management system, power management server, and power management method.

BACKGROUND ART

In recent year, a mechanism that gives environment additive value to output power or the like utilized by natural energy such as solar power, wind power, and geothermal power is attracting attention. For example, a "Green Power Certificate" that is certificated by a third party is mentioned as the environment additive value. Further, a technology is proposed to take into account loses (hereinafter, power lose) occurring in a power path from a power generation facility to a consumption facility when calculating the above environment additive value (for example, Patent Literature 1).

CITATION LIST

Patent Literature

Patent Literature 1: International Publication No. 2016/110920 Pamphlet

SUMMARY OF THE INVENTION

A power management system according to a first disclosure includes an output facility configured to output output power with environment additive value and a consumption facility configured to consume at least a part of the output power. The power management system includes: a first receiver configured to receive, from the output facility, a message including an information element indicating the output power, a second receiver configured to receive, from the consumption facility, a message including an information element indicating consumption power consumed by the consumption facility, and a controller configured to manage the consumption power and output power. The controller is configured to identify the output power occupied in the consumption power and identify alternative power corresponding to a power loss, based on the power loss occurring on a power path from the output facility to the consumption facility. The controller is configured to identify the environment additive value corresponding to the output power occupied in the consumption power without based on the power loss.

A power management server according to a second disclosure includes an output facility configured to output output power with environment additive value, and a consumption facility configured to consume at least a part of the output power. The power management server includes: a first receiver configured to receive, from the output facility, a message including an information element indicating the output power; a second receiver configured to receive, from the consumption facility, a message including an information element indicating consumption power consumed by the consumption facility; and a controller configured to manage the consumption power and output power. The controller is configured to identify the output power occupied in the consumption power and identify alternative power corresponding to a power loss, based on the power loss occurring on a power path from the output facility to the consumption facility. The controller is configured to identify the environment additive value corresponding to the output power occupied in the consumption power without based on the power loss.

A power management method according to a third disclosure includes receiving, from an output facility configured to output output power with environment additive value, a message including an information element indicating the output power, receiving, from a consumption facility configured to consume at least a part of the output power, a message including an information element indicating consumption power consumed by the consumption facility, identifying the output power occupied in the consumption power based on a power loss occurring on a power path from the output facility to the consumption facility and identifying alternative power corresponding to a power loss, based on the power loss occurring on a power path from the output facility to the consumption facility, and identifying the environment additive value corresponding to the output power occupied in the consumption power without based on the power loss.

DESCRIPTION OF EMBODIMENTS

In a predetermined power grid such as a micro grid, a case where power is supplied from a power generation facility to a consumption facility is considered. Or, a case where power output from the power generation facility is stored in a storage battery apparatus and then the power is supplied from the storage battery apparatus to the consumption facility is considered.

In these cases, if environment additive value is calculated based on the above power lose, there is a possibility that an entity providing a predetermined power grid, an entity providing the storage battery apparatus, and so on suffer a disadvantage and diffusion of activity to increase the environment additive value is hindered.

Then, the present disclosure is made to solve the above problem, and is possible to promote utilization of output power with environment additive value.

A power management system according to the embodiments includes an output facility configured to output output power with environment additive value and a consumption facility configured to consume at least a part of the output power. The power management system includes: a first receiver configured to receive, from the output facility, a message including an information element indicating the output power, a second receiver configured to receive, from the consumption facility, a message including an information element indicating consumption power consumed by the consumption facility, and a controller configured to manage the consumption power and output power. The controller is configured to identify the output power occupied in the consumption power and identify alternative power corresponding to the power loss, based on a power loss occurring on a power path from the output facility to the consumption facility. The controller is configured to identify the environment additive value corresponding to the output power occupied in the consumption power without based on the power loss.

In the following, it will be described with reference to the drawings about the embodiment. Further, in the following description of the drawings, same or similar parts are marked with same or similar signs.

However, it should be noted that the drawings are schematic and ratios of each dimension may be different from actual dimensions. Therefore, specific dimensions should be determined in consideration of the following description. In addition, it is needless to say that the drawings may include portions having different dimensional relationships or ratios.

Embodiments (Power Management System)

Figure 1:
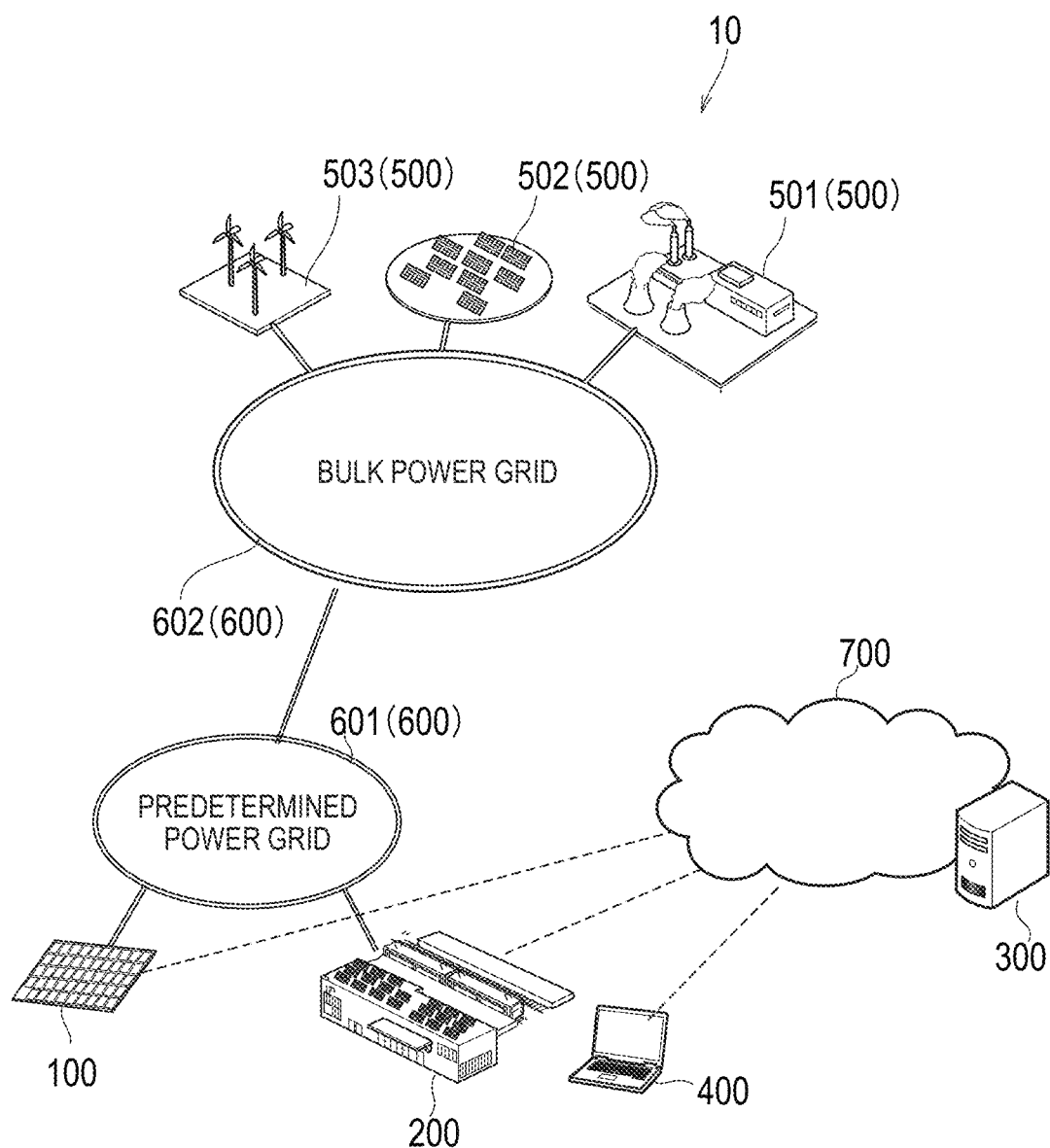
FIG. 1 is a diagram illustrating a power management system 10 according to an embodiment.

In the following, it will be described about a power management system according to the embodiments. As illustrated in FIG. 1, the power management system 10 includes an output facility 100, consumption facility 200, power management server 300, terminal 400, and power station 500. The power management system 10 includes a power grid 600 and network 700.

The output facility 100 is connected to a predetermined power grid 601 configuring the power grid 600. The output facility 100 outputs power with environment additive value to the predetermined power grid 601. For example, the output facility 100 includes a distributed power supply such as a solar cell apparatus, fuel cell apparatus, storage battery apparatus, biomass power generation apparatus, or wind power generation apparatus.

The consumption facility 200 is connected to the predetermined power grid 601 configuring the power grid 600. The consumption facility 200 consumes power supplied from the predetermined power grid 601. Here, a case where the consumption facility 200 consumes at least a part of output power output from the output facility 100 is assumed. Though it is not limited, the consumption facility 200 may be a small-scale facility such as a home or store, or big-scale facility such as a building, shopping mall, athletics stadium, feeder of a railroad, charging stand for an electric vehicle, or station.

The power management server 300 manages the output power output from the output facility 100, consumption power consumed by the consumption facility 200, or the like. In the embodiments, the power management server 300 manages environment additive value corresponding to the output power occupied in the consumption power. It will be described about details of the power management server 300 later (see, FIG. 2).

The terminal 400 is a terminal used by a user referring to information managed by the power management server 300. For example, the terminal 400 is a terminal such as a personal computer, smartphone, or tablet. The user may be a user of the output facility 100 or consumption facility 200, or a user providing the predetermined power grid 601.

The power station 500 is connected to a bulk power grid 602 configuring the power grid 600. The power station 500 supplies deficient power at the predetermined power grid 601 to the predetermined power grid 601. For example, the power station 500 may be a thermal power station 501, solar cell facility including a plurality of solar cells (mega solar 502), or wind power station 503.

The power grid 600 is a power network using for power transmission of power. The power grid 600 may include the predetermined power grid 601 and bulk power grid 602. For example, the predetermined power grid 601 may be referred to as micro grid. The predetermined power grid 601 may cover a narrower area than the bulk power grid 602, or cover a wider area than the bulk power grid 602. The predetermined power grid 601 is a power network of lower voltage than the bulk power grid 602, and may be a power network of a smaller power transmission loss than the bulk power grid 602. The predetermined power grid 601 may be a power network provided or managed by a one entity.

In FIG. 1, though a case where the power grid 600 includes the predetermined power grid 601 and bulk power grid 602 is exemplified, the power grid 600 may include the predetermined power grid 601 without including the bulk power grid 602. In this case, the above power station 500 may be connected to the predetermined power grid 601.

The network 700 is a communication network connecting the output facility 100, consumption facility 200, and power management server 300. The network 700 may connect the terminal 400. For example, the network 700 may include an Internet, private network such as a VPN (Virtual Private Network), or mobile phone network.

(Power Management Server)

Figure 2:
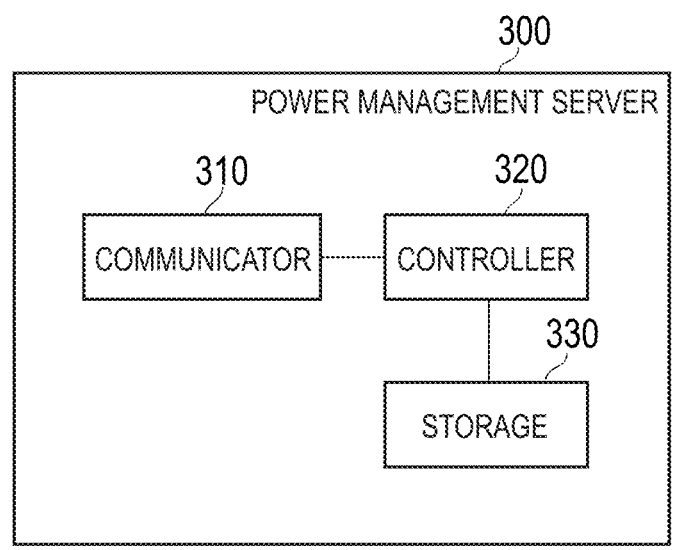
FIG. 2 is a diagram illustrating a power management server 300 according to an embodiment.

In the following, it will be described about a power management server according to the embodiments. As illustrated in FIG. 2, the power management server 300 includes a communicator 310, controller 320, and storage 330.

The communicator 310 is configured by a communication module. The communication module may be a radio communication module conforming to a standard such as IEEE802.11a/b/g/n, ZigBee, Wi-SUN, or wired communication module conforming to a standard such as IEEE802.3. The communicator 310 performs communication with the output facility 100, consumption facility 200, and terminal 400 via the network 700.

In the embodiments, the communicator 310 configures a first receiver which receives, from the output facility 100, a message including an information element indicating the output power output from the output facility 100. The communicator 310 configures a second receiver which receives, from the consumption facility 200, a message including the consumption power consumed by the consumption facility 200. Here, the "power" may be power in unit time (for example, kW) or a power amount in predetermined time (for example, kW/h).

Further, the first receiver and second receiver may be configured by a single the communicator 310, or configured by separate the communicators 310.

The communicator 310 may configures a transmitter which transmits a message including an information element indicating environment additive value. For example, the communicator 310 transmits this message to the terminal 400. The communicator 310 may configure a transmitter which transmits a message including an information element indicating at least either one of output power and alternative power occupied in consumption power. For example, the communicator 310 transmits this message to the terminal 400.

The controller 320 may include at least one processor. According to various embodiments, at least the one processor may be realized as a single integrated circuit (IC), or a plurality of integrated circuits IC and/or discrete circuits that is communicable connected. The controller 320 controls each configuration installed in the power management server 300.

In the embodiments, the controller 320 manages consumption power and output power. For example, the controller 320 may manage the consumption power and output power by storing the consumption power and output power in the storage 330. The controller 320 identifies the output power occupied in the consumption power and alternative power corresponding to a power loss based on the power loss occurring on a power path from the output facility 100 to the consumption facility 200. The controller 320 identifies environment additive value corresponding to the output power occupied in the consumption power, without based on the power loss.

In examples illustrated in FIG. 1, the power path is configured by the predetermined power grid 601 connecting the output facility 110 and consumption facility 200. Therefore, the power loss includes a power transmission loss occurring by the predetermined power grid 601.

The storage 330 is configured by a storage medium such as a memory being a nonvolatile memory or the like and/or HDD (Hard disk drive), and stores various information. The storage 330 can be an arbitrary storage apparatus in addition, for example, the storage 330 may be an optical storage apparatus such as an optical disk or magneto-optical disk. In the embodiments, the storage 330 may store the consumption power and output power managed by the controller 320. The storage 330 may store information to identify the power path from the output facility 100 to the consumption facility 200 such as location of the output facility 100 and consumption facility 200 and configuration of the predetermined power grid 601. The storage 330 may store information to identify the power transmission loss occurring at the predetermined power grid 601 such as a power transmission loss ratio of the predetermined power grid 601.

(Identification Method of Environment Additive Value)

Figure 3:
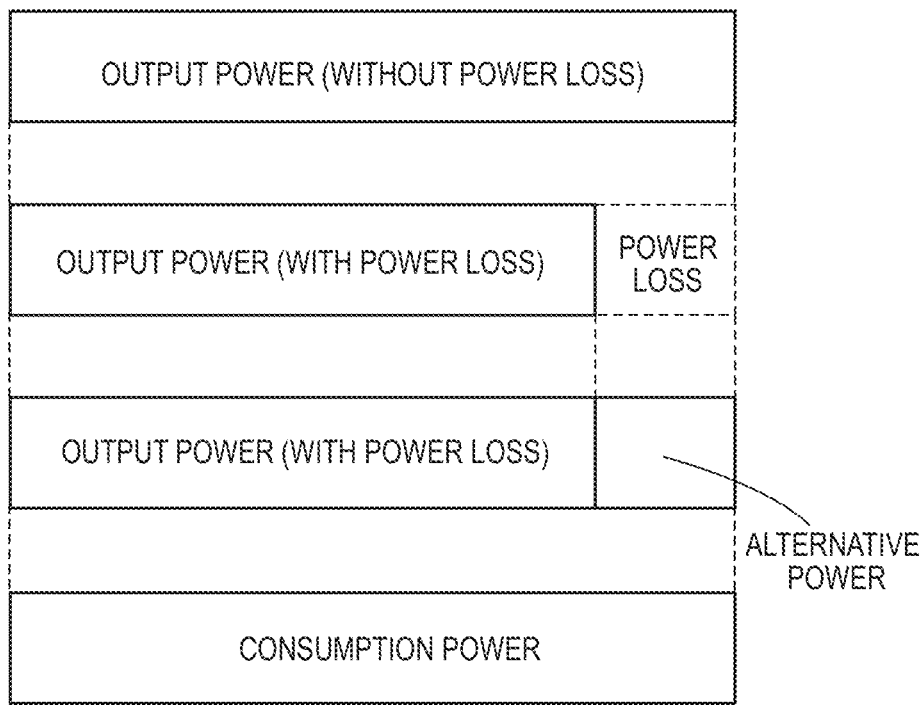
FIG. 3 is a diagram for explaining an identification method of environment additive value according to an embodiment.

In the following, it will be described about an identification method of environment additive value according to the embodiments mainly. In FIG. 3, for simplicity of explanation, it is exemplified about a case where output power output from the output facility 100 (hereinafter, output power (without power loss)) is same as consumption power consumed at the consumption facility 200. However, the output power may be larger than the consumption power or smaller than the consumption power.

As illustrated in FIG. 3, due to that a power loss (for example, power transmission loss) on a power path from the output facility 100 to the consumption facility 200 is occurred, it is considered that power (hereinafter, output power (with power loss)) obtained by subtracting the power loss from the output power (without power loss) will theoretically reach to the consumption facility 200. Therefore, since the output power (with power loss) is smaller than the consumption power, alternative power corresponding to the power loss is supplied from a power supply other than the output facility 100 to the consumption facility 200 theoretically. For example, the power supply other than the output facility 100 is the power station 500.

Figure 4:
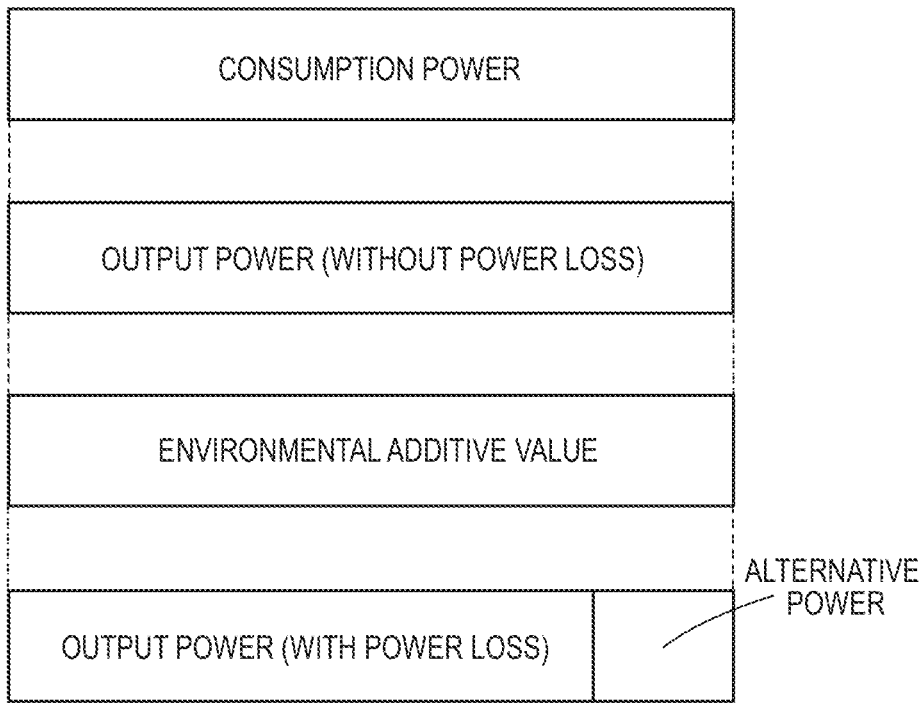
FIG. 4 is a diagram for explaining an identification method of environment additive value according to an embodiment.

In this case, as illustrated in FIG. 4, the power management server 300 identifies the output power (with power loss) occupied in the consumption power based on the power loss occurring on the power path from the output facility 100 to the consumption facility 200, and identifies the alternative power corresponding to the power loss. On the other hand, the power management server 300 identifies environment additive value corresponding to the output power occupied in the consumption power without based on the power loss.

That is, the power management server 300 identifies the environment additive value by referring to the output power (without power loss). On the other hand, the power management server 300 identifies the output power (with power loss) and alternative power as a breakdown of the consumption power consumed by the consumption facility 200 actually.

(Power Management Method)

In the following, it will be described about a power management method according to the embodiments.

Figure 5:
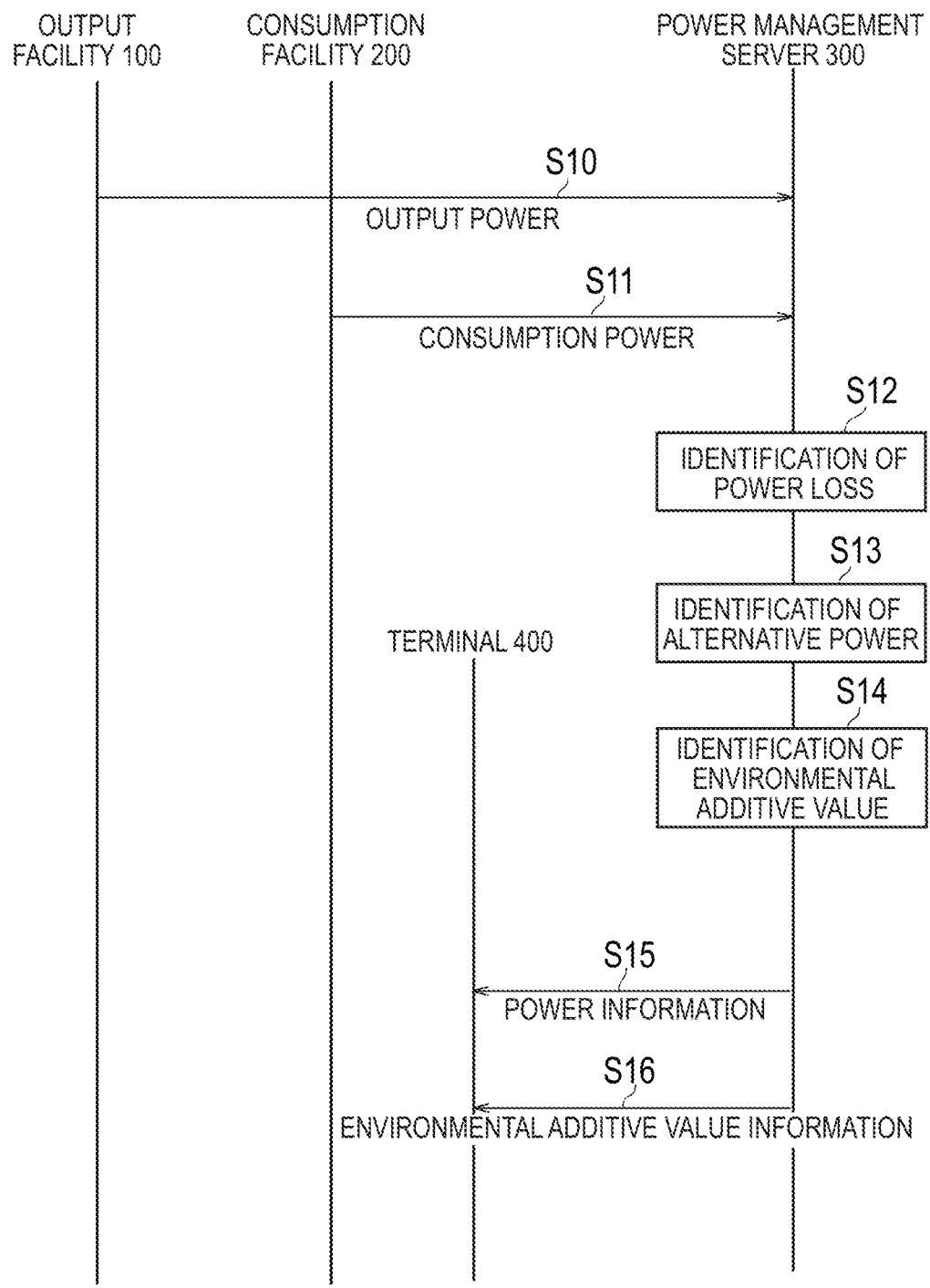
FIG. 5 is a diagram illustrating a power management method according to an embodiment.

As illustrated in FIG. 5, in Step S10, the power management server 300 receives, from the output facility 100, a message including an information element indicating output power output from the output facility 100. Output power possible to identify by the message transmitted by Step S10 is the above output power (without power loss).

In Step S11, the power management server 300 receives, from the consumption facility 200, a message including consumption power consumed by the consumption facility 200.

In Step S12, the power management server 300 identifies a power loss occurring on a power path from the output facility 100 to the consumption facility 200. Information stored in the storage 330 may be referred in the identification of the power loss.

In Step S13, the power management server 300 identifies output power occupied in consumption power based on the power loss, and identifies alternative power corresponding to the power loss. Here, the output power identified in Step S13 is the above output power (with power loss).

In Step S14, the power management server 300 identifies environment additive value corresponding to the output power occupied in the consumption power without based on the power loss. In other words, the power management server 300 identifies the environment additive value based on the above output power (without power loss).

In Step S15, the power management server 300 transmits, to the terminal 400, a message including an information element indicating at least either one of the output power and alternative power occupied in the consumption power. Here, the output power occupied in the consumption power is the output power (with power loss) identified in Step S13. The alternative power occupied in the consumption power is power identified based on the power loss in Step S13.

In Step S16, the power management server 300 transmits a message including an information element indicating the environment additive value to the terminal 400.

Operation and Effect

In the embodiment, the power management server 300 identifies the output power occupied in the consumption power and identifies the alternative power corresponding to the power loss based on the power loss occurring on the power path from the output facility 100 to the consumption facility 200. On the other hand, the power management server 300 identifies the environment additive value corresponding to the output power occupied in the consumption power without based on the power loss.

According to the configuration, as a breakdown of the consumption power consumed by the consumption facility 200, it is possible to manage adequately the output power (with power loss) and alternative power, and promote utilization of the output power with the environment additive value by identifying the environment additive value based on the output power (without power loss).

Modified Example 1

In the following, it will be described about a modified example 1 according to the embodiments. In the first modified example, it will be described about different points to the above embodiments mainly.

In the modified example 1, it will be described about a case where the power path from the output facility 100 to the consumption facility 200 includes a storage battery apparatus which stores output power output from the output facility 100.

Figure 6:
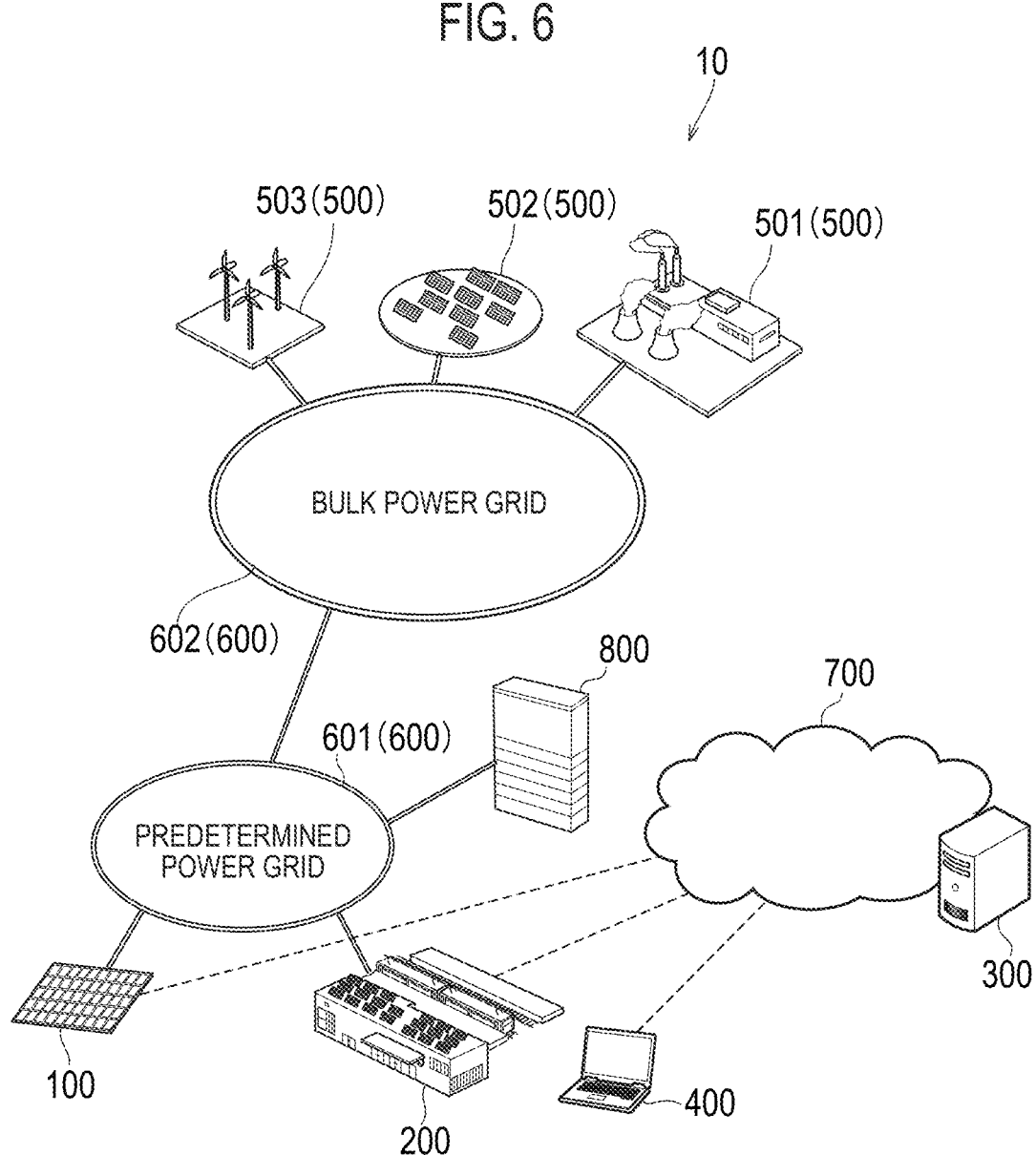
FIG. 6 is a diagram illustrating a power management system 10 according to a modified example 1.

As illustrated in FIG. 6, the power management system 10 includes a storage battery apparatus 800. The storage battery apparatus 800 stores the output power output from the output facility 100. Here, the output power output from the output facility 100 is stored in the storage battery apparatus 800, and power output from the storage battery apparatus 800 is supplied to the consumption facility 200. Therefore, it may be considered that the storage battery apparatus 800 is installed on a power path from the output facility 100 to the consumption facility 200.

In such the case, a power loss occurring on the power path from the output facility 100 to the consumption facility 200 may include a conversion loss occurring at the storage battery apparatus 800. The power loss may include a power transmission loss occurring on a power path from the output facility 100 to the storage battery apparatus 800, or a power transmission loss occurring on a power path from the storage battery apparatus 800 to the consumption facility 200.

Furthermore, the storage battery apparatus 800 may transmit, to the power management server 300, a message including an information element indicating the conversion loss occurring at the storage battery apparatus 800.

Figure 7:
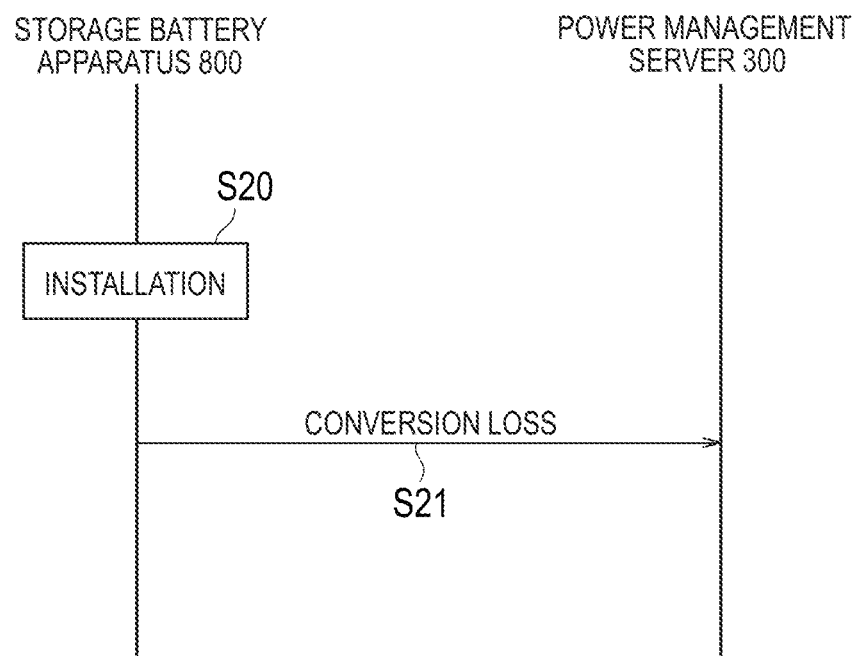
FIG. 7 is a diagram for explaining about a modified example 2.

Though it is not limited especially, timing transmitting the message may be timing when the storage battery apparatus 800 is installed. Concretely, as illustrated in FIG. 7, in Step S20, when the storage battery apparatus 800 is installed, in Step S21, the storage battery apparatus 800 may transmit a message (conversion loss of FIG. 7) including the information element indicating the conversion loss to the power management server 300.

Figure 8:
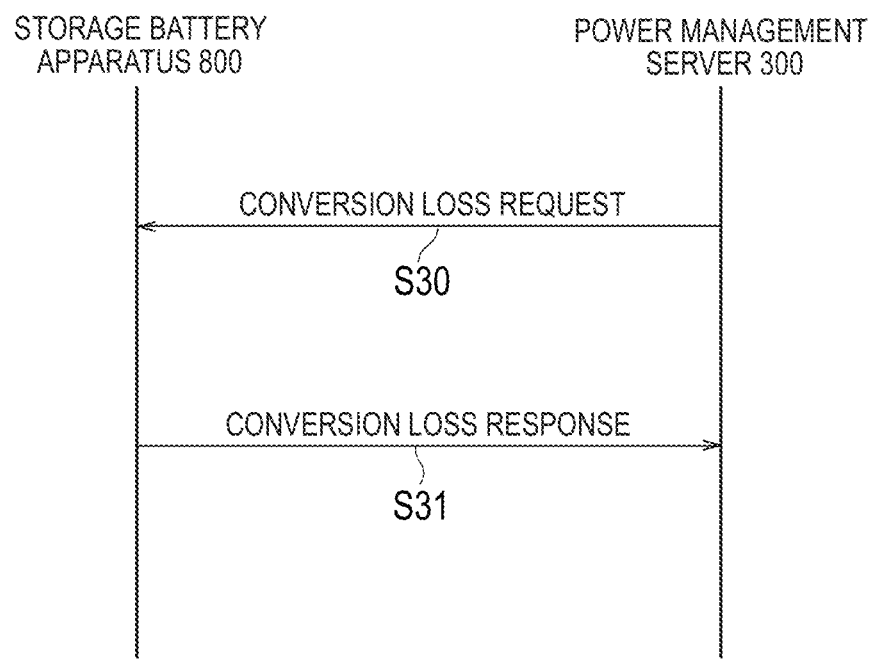
FIG. 8 is a diagram for explaining about a modified example 2.

Or, the timing transmitting the message may be timing requested from the power management server 300. Concretely, as illustrated in FIG. 8, in Step S30, when receiving a message requesting the conversion loss from the power management server 300 (conversion loss request in FIG. 8), in Step S31, the storage battery apparatus 800 may transmit a message (conversion loss response in FIG. 8) including the information element indicating the conversion loss to the power management server 300.

In these cases, the above communicator 310 configures a third receiver which receives a message including the information element indicating the conversion loss from the storage battery apparatus 800.

Modified Example 2

In the following, it will be described about a modified example 2 according to the embodiments. In the modified example 2, it will be described about difference points to the above embodiments mainly.

In the modified example 2, it will be described about a case where an alternative power supply which outputs a predetermined power with environment additive value is installed in the bulk power grid 602 connected to the predetermined power grid 601. For example, the alternative power may be the mega solar 502 or wind power station 503 as illustrated in FIG. 1.

In such the case, the power management server 300 (controller 320) may identify the environment additive value corresponding to the predetermined power based on a power loss occurring on a power path from the alternative power supply to the consumption facility 200 when the alternative power includes the predetermined power.

That is, the power management server 300 may identify the environment additive value without considering the power loss, with respect to output power output from the output facility 100. On the other hand, the power management server 300 may identify the environment additive value with considering the power loss, with respect to the predetermined power output from the alternative power supply installed at the bulk power grid 602.

According to the configurations, since the output facility 100 installed at the predetermined power grid 601 is given preferential treatment, it is expected that the output facility 100 outputting power with the environment additive value will be installed, and it is possible to promote utilization of the output power with the environment additive value.

Other Embodiments

Though the present disclosure is described by the above embodiments, statements and drawings that forms a part of the present disclosure should not be understood as limiting the invention. Various alternative embodiments, examples, and operational techniques will become apparent to those skill in the art from the disclosure.

In the embodiments, the case where one the output facility 100 is installed is exemplified. However, the embodiments are not limited to this. The power management system 10 may include two or more the output facilities 100.

In the embodiments, the case where one the consumption facility 200 is installed is exemplified. However, the embodiments are not limited to this. The power management system 10 may include two or more the consumption facilities 200.

In the embodiments, the distributed power supply such as the solar cell apparatus, fuel cell apparatus, or storage battery apparatus is exemplified as the power with the environment additive value. However, the embodiments are limited to this. The power with the environment additive value may be power with less impact to the environment (for example, power with low $CO_2$ emissions). For example, the power with the environment additive value may be power output by using solar power, wind power, and geothermal power, biomass, or the like, or regenerative power occurring by a regenerative brake or the like installed on a mobile body such as a vehicle or electric train. In the embodiments, though a phrase of "power with environment additive value"

is used as the power with less impact to the environment, the present disclosure is not limited to this, and the phrase may be "power with greenhouse gas reduction value", for example.

Though it is not specifically described in the embodiments, a following case is possible to consider as a mechanism that allocates environment additive value of the output facility 100 to the consumption facility 200. For example, the output facility 100 and consumption facility 200 may be matching in advance. Or, each of the output facility 100 and consumption facility 200 declares a price to the environment additive value, and the matching of the output facility 100 and consumption facility 200 may be performed based on the declared price. For example, the matching may be performed by the power management server 300.

Though it is not specifically described in the embodiments, the power management server 300 may be realized by a central management type server installed on the network 700. Or, the power management server 300 may be realized by two or more distributed nodes installed on the network 700. In such the case, the power management server 300 may be realized by a block-chain technology.

Though it is not specifically described in the embodiments, the storage battery apparats may include a lithium-ion battery, sodium-sulfur battery, redox flow battery, or the like. The storage battery apparatus may be a storage battery apparatus using a flywheel, a storage battery apparatus using pumped power generation, or a storage battery apparatus using hydrogen power generation.

The invention claimed is:

1. A power management system comprising:
an output facility configured to output output power with environment additive value;
a consumption facility configured to consume at least a part of the output power; and
a power management server,
wherein
the power management server includes:
a first receiver configured to receive, from the output facility, a message including an information element indicating the output power;
a second receiver configured to receive, from the consumption facility, a message including an information element indicating consumption power consumed by the consumption facility; and
a controller configured to manage the consumption power and output power, and
the controller is configured to:
identify, based on a power loss occurring on a power path from the output facility to the consumption facility, both the output power occupied in the consumption power and alternative power corresponding to the power loss, and
identify the environment additive value corresponding to the output power occupied in the consumption power without based on the power loss.

2. The power management system according to claim 1, wherein
the power path is configured by a predetermined power grid that connects the output facility and consumption facility, and
the power loss includes a power transmission loss occurring at the predetermined power grid.

3. The power management system according to claim 1, wherein
the power path includes a storage battery apparatus storing the output power, and
the power loss includes a conversion loss occurring at the storage battery apparatus.

4. The power management system according to claim 3, further comprising a third receiver configured to receive a message including an information element indicating the conversion loss from the storage battery apparatus.

5. The power management system according to claim 4, wherein
the third receiver is configured to receive the message including the information element indicating the conversion loss at timing when the storage battery apparatus is installed.

6. The power management system according to claim 4, further comprising a transmitter configured to transmit the message including the information element indicating the conversion loss to the storage battery apparatus, wherein
the third receiver is configured to receive the message including the information element indicating the conversion loss transmitted from the storage battery apparatus when the storage battery apparatus receives a message requesting the information element indicating the conversion loss.

7. The power management system according to claim 1, further comprising a transmitter configured to transmit a message including an information element indicating the environment additive value.

8. The power management system according to claim 1, further comprising a transmitter configured to transmit a message including an information element indicating at least one of the output power or the alternative power occupied in the consumption power.

9. The power management system according to claim 2, further comprising an alternative power source installed in a bulk power grid connected to the predetermined power grid and configured to output predetermined power with the environment additive value, wherein
the controller is configured to identify the environment additive value corresponding to the predetermined power based on a power loss occurring on a power path from the alternative power source to the consumption facility when the alternative power includes the predetermined power.

10. A power management server comprising:
a first receiver configured to receive, from an output facility configured to output output power with environment additive value, a message including an information element indicating the output power;
a second receiver configured to receive, from a consumption facility configured to consume at least a part of the output power, a message including an information element indicating consumption power consumed by the consumption facility; and
a controller configured to manage the consumption power and output power,
wherein the controller is configured to:
identify, based on a power loss occurring on a power path from the output facility to the consumption facility, both the output power occupied in the consumption power and alternative power corresponding to the power loss, and
identify the environment additive value corresponding to the output power occupied in the consumption power without based on the power loss.

11. A power management method, comprising:

receiving, from an output facility configured to output output power with environment additive value, a message including an information element indicating the output power;

receiving, from a consumption facility configured to consume at least a part of the output power, a message including an information element indicating consumption power consumed by the consumption facility;

identifying, based on the power loss occurring on a power path from the output facility to the consumption facility, both the output power occupied in the consumption power and alternative power corresponding to the power loss; and identifying the environment additive value corresponding to the output power occupied in the consumption power without based on the power loss.

\* \* \* \* \*